United States Patent
Xu

(10) Patent No.: US 12,007,773 B2
(45) Date of Patent: Jun. 11, 2024

(54) METHOD AND APPARATUS FOR CONTROLLING ROBOT, AND ROBOT

(71) Applicant: Beijing Xiaomi Robot Technology Co., Ltd., Beijing (CN)

(72) Inventor: Haiwang Xu, Beijing (CN)

(73) Assignee: Beijing Xiaomi Robot Technology Co., Ltd., Beijing (CN)

( * ) Notice: Subject to any disclaimer, the term of this patent is extended or adjusted under 35 U.S.C. 154(b) by 205 days.

(21) Appl. No.: 17/557,640

(22) Filed: Dec. 21, 2021

(65) Prior Publication Data

US 2022/0253060 A1    Aug. 11, 2022

(30) Foreign Application Priority Data

Feb. 9, 2021   (CN) .......................... 202110178931.0

(51) Int. Cl.
G05D 1/00   (2006.01)

(52) U.S. Cl.
CPC .................................. G05D 1/0214 (2013.01)

(58) Field of Classification Search
CPC ......... G05B 13/00; G05D 3/00; B60W 20/00; B60W 2754/00; B60W 2710/00; G06T 11/00; G06T 15/00; G06T 17/00; B60T 2250/00; B60T 2260/00; B60T 2230/00
See application file for complete search history.

(56) References Cited

U.S. PATENT DOCUMENTS

| 9,789,607 | B1 | 10/2017 | Whitman |
| 2020/0089970 | A1 | 3/2020 | Lee et al. |
| 2020/0117198 | A1* | 4/2020 | Whitman ............ G05D 1/0248 |
| 2020/0323412 | A1 | 10/2020 | Arnold et al. |

FOREIGN PATENT DOCUMENTS

CA   3137434 A1 * 10/2020 .......... A47L 11/4011

OTHER PUBLICATIONS

Xiong, Y., Ge, Y., Grimstad, L., & From, P. J. (Jun. 5, 2019). An autonomous strawberry-harvesting robot . . . -wiley online library. An autonomous strawberry-harvesting robot: Design, development, integration, and field evaluation. https://onlinelibrary.wiley.com/doi/10.1002/rob.21889 (Year: 2019).*
European Patent Application No. 21217904.8, Search and Opinion dated Jun. 15, 2022, 11 pages.

* cited by examiner

*Primary Examiner* — Khoi H Tran
*Assistant Examiner* — Bryant Tang
(74) *Attorney, Agent, or Firm* — COZEN O'CONNOR

(57) ABSTRACT

A method for controlling a robot includes: obtaining a target action of the robot; obtaining environment information of a working environment where the robot is located; determining a target work area of the robot based on the environment information and the target action; and controlling the robot to move in the target work area based on the target action.

17 Claims, 2 Drawing Sheets

METHOD AND APPARATUS FOR CONTROLLING ROBOT, AND ROBOT

CROSS REFERENCE TO RELATED APPLICATIONS

This application claims priority to Chinese Patent Application No. 202110178931.0, filed on Feb. 9, 2021, the content of which is incorporated herein by reference as if fully set forth.

TECHNICAL FIELD

The disclosure relates to the technical field of robots, and particularly to a method and an apparatus for controlling a robot, a robot, an electronic device, and a storage medium.

BACKGROUND

In the related art, distance sensors (including contact and non-contact sensors) are usually used to detect a distance from an obstacle and the robot is controlled to perform obstacle avoidance. However, in the related art, the robots cannot avoid dangers autonomously, which affects the perception ability of robots, resulting in low safety of robot operation and affecting the user experience.

SUMMARY

According to a first aspect of the disclosure, a method for controlling a robot is provided. The method includes: obtaining a target action of the robot; obtaining environment information of a working environment where the robot is located; determining a target work area of the robot based on the environment information and the target action; and controlling the robot to move in the target work area based on the target action.

According to a second aspect of the disclosure, an apparatus for controlling a robot includes a processor and a memory for instructions executable by the processor. The processor is configured to call and execute the instructions to implement the method for controlling a robot according to the first aspect of the disclosure.

According to a third aspect of the disclosure, a robot includes a head, a torso body, legs connected with the torso body, feet connected with the legs, a sensor, a controller connected with the torso body, and a navigator. The sensor may be configured to obtain obstacle information by detecting a working environment where the robot is located. The controller may be configured to obtain a target action of the robot, determine ground material information of the working environment through a deep neural network model, determine a target work area of the robot based on the obstacle information, the ground material information and the target action, and control the robot to move in the target work area based on the target action. The navigator may be configured to, in response to an open area being not present in a historical map, set an area with a current position of the robot as a circle center and a preset distance as a radius and search the target work area in the set area.

The additional aspects and advantages of the disclosure will be partially given in the following description, and some will become apparent from the following description, or be understood through the practice of the disclosure.

DETAILED DESCRIPTION

The example embodiments will be described in detail here, and examples thereof are shown in the accompanying drawings, throughout which the same or similar numbers represent the same or similar elements or elements with the same or similar functions. The embodiments described with reference to the accompanying drawings are exemplary and are intended to explain the disclosure but cannot be understood as a limitation of the disclosure.

Hereafter, a method and an apparatus for controlling a robot and a robot are described with reference to the drawings in the embodiments of the disclosure.

It should be noted that, the embodiments of the disclosure are applicable to medium and low dynamic working environments, where most of the objects are moving at a speed less than 1.8 km/h. The working environments may be identified with assistance of human beings, for example, in a way that the robots are informed that the environment is indoor or outdoor. In an embodiment, the robot may automatically identify the environment.

It should be noted that, the robot in the embodiments of the disclosure may be a multi-degree-of-freedom foot robot, such as a biped robot, a quadruped robot and a tripod robot, which is not limited herein.

Figure 1:
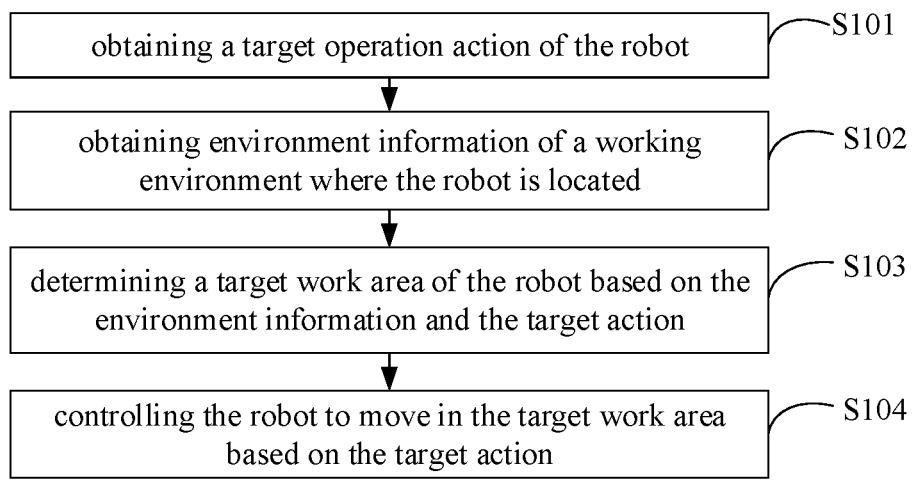
FIG. 1 is a flowchart of a method for controlling a robot according to an embodiment of the disclosure.

FIG. 1 is a flowchart of a method for controlling a robot according to an embodiment of the disclosure. The method may be executed using an electronic device. Specifically, the electronic device may be, but is not limited to, a computer and a mobile terminal which may be, but is not limited to, a personal computer, a smart phone, an iPad, etc.

As illustrated in FIG. 1, the method for controlling a robot includes the following steps S101 to S104.

At S101, a target operation action of the robot is obtained.

In the embodiment of the disclosure, the action to be controlled to perform by the robot can be called a target operation action. For example, the target operation action can include a moving action, a cooperative action operated with humans, turning a somersault, dancing, etc.

Specifically, when the robot is controlled according to the actual needs to make the robot perform actions that meet the needs, it is necessary to obtain the target operation action of the robot.

At S102, it is obtained current environment information of a working environment where the robot is located.

The current environment information of the working environment where the robot is located can be understood as any information on visually visible content in the current environment where the robot is located. The current environment information can also be understood as information of any object that can/cannot affect robot motions, which can be used to characterize the condition of the objects contained in the current environment where the robot is located. For example, the current environment information can include road information, road condition information, obstacle information, etc. where the robot is located.

Specifically, the working environment can be detected in real time when the robot is running. The main detection areas can be the operated ground and the operating ground, so as to obtain the current environment information of the working environment where the robot is located.

At S103, a target work area of the robot is determined based on the current environment information and the target operation action.

In the embodiment of the disclosure, the area supporting the robot to perform the target operation action can be considered as a target working area. In other words, the safe and undisturbed area where the robot can normally perform the target operation action is considered as a target working area.

Specifically, after obtaining the target operation action and the current environment information of the working environment where the robot is located, the environment area that meets or supports the robot to perform the target operation action can be selected from the environment area indicated by the current environment information, and the selected environment area can be used as the target working area of the robot.

At S104, the robot is controlled to move in the target work area based on the target operation action.

Specifically, after determining the target working area of the robot, the robot can be controlled to perform the target operation action in the target working area, so as to realize control of the robot.

For example, if the target operation action of the robot is a dancing action, and the current environment information of the working environment where the robot is located includes a rough road area, an obstacle area and an open and smooth road area, the open and smooth road area can be determined as the target working area, and the robot can be controlled to dance in the open and smooth road area, Thus, the automatic control of the robot is realized.

With the method for controlling a robot according to the embodiment of the disclosure, the target working area of the robot is determined based on the current environment information and the target operation action, the robot is controlled to move in the target working area based on the target operation action, so as realize automatic control of the robot. Therefore, it is conducive to the robot to avoid danger autonomously, improving the perception ability and the operation safety of the robot and improving the user experience.

In an embodiment of the disclosure, the current environment information may include ground material information and obstacle information of the working environment where the robot is located.

Figure 2:
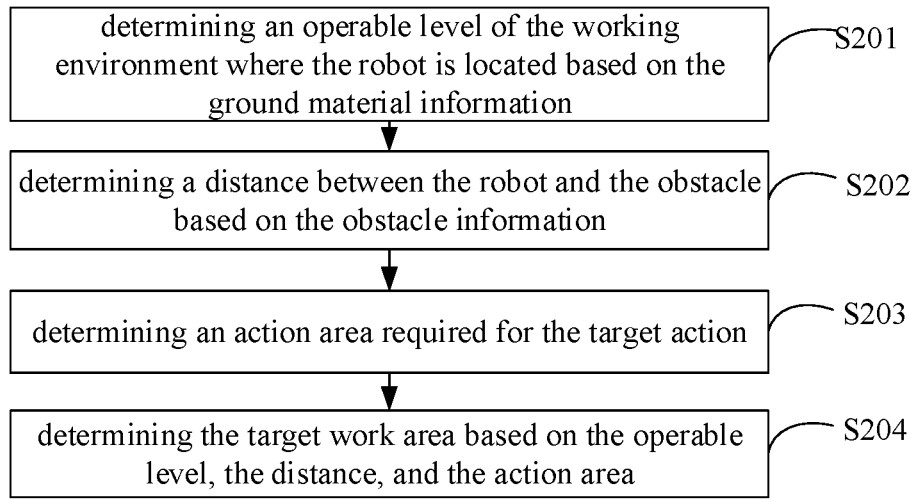
FIG. 2 is a flowchart of a method for determining a target working area according to an embodiment of the disclosure.

In the embodiment, as illustrated in FIG. 2, determining the target work area of the robot based on the current environment information and the target operation action at S103 may include the steps at S201 to S204.

At S201, an operable level of the working environment where the robot is located is determined based on the ground material information.

It should be noted that in the embodiment of the disclosure, a database containing a variety of ground material images can be obtained in advance, and a depth neural network model with a function of identifying ground materials can be trained based on the database. The depth neural network model is used for depth learning for the robot to finally identify the type of the ground material.

The operable level can be used to characterize the level that the current ground environment is suitable for robot stepping or action. It can be disposed that the higher the operable level, the more suitable for operation. For example, when the operable level is 0, it means that the current ground is not suitable for robot stepping or action.

Specifically, after obtaining the target operation action and the current environment information of the working environment where the robot is located, the ground material information of the working environment where the robot is located can be determined through the deep neural network model. Then, the operable level of the robot's working environment can be determined based on the ground material information.

When the ground material is hard and non-destructible (such as metal), it can be determined that the operable level is relatively high. When the ground material is soft and non-destructible (such as cotton cloth), it can be determined that the operable level is intermediate. When the ground material is hard and destructible (such as glass), it can be determined that the operable level is relatively low. When the ground material is soft and destructible (such as sand), it can be determined that the operable level is 0.

It should be noted that, the working environment can be detected in real time when the robot is running. The main detection areas can be the operated ground and the operating ground. When it is generated that the operable level is 0 (that is, the detection result is that the ground is inoperable), the current position should be set as a limited size of an insurmountable single plane obstacle (such as an electronic isolation wall for prohibiting robot operation), the robot is returned to the previous posture, and a navigator is called to avoid dangers.

At S202, a distance between the robot and the obstacle is determined based on the obstacle information.

The obstacle information can be understood as relevant information of the obstacle, which can include the position where the obstacle is located, a state of the obstacle and other information. The obstacle information can be obtained by any 3D positioning and map.

The obstacle information can be obtained through a camera on the robot, and then the distance between the robot and the obstacle can be determined based on the obstacle information.

It should be noted that in order to improve the reliability of determining the working area, the minimum Euler distance between the robot and the obstacle can be determined based on the obstacle information.

At S203, an action area required for the target operation action is determined.

The action area can be understood as a "restricted area" or an area where the robot cannot operate except the target working area. The action area may not contain requirements for the operability of the working environment.

At S204, the target work area is determined based on the operable level, the distance, and the action area.

Specifically, after the operable level, the distance between the robot and the obstacle and the action area are determined, the target working area can be determined based on the operable level, the distance and the action area.

Therefore, the reliability and accuracy of the target working area can be improved by determining the target working area based on the operable level, the distance and the action area.

It should be noted that, different operation actions correspond to different action areas. Since the actions completed by the robot are not just mobile tasks, but may include complex actions such as jumping, dancing and somersault, various actions need to be considered when determining the action area, instead of just considering the moving action.

Therefore, in order to ensure the reliability of the action area, the specific target operation action can be considered when determining the action area in the embodiment of the disclosure.

That is, in an embodiment of the disclosure, the target operation includes a moving operation and a non-moving operation. The non-moving operation can be a motion operation other than the moving operation, which can include complex actions such as jumping, dancing, somersault and so on.

In the embodiment, the step at S203 may include in response to the target operation action being a moving operation, determining a polyhedron corresponding to a torso body of the robot as the action area.

Further, after the polyhedron corresponding to the torso body of the robot is determined as the action area, the method can also include: obtaining a moving speed and a moving direction of the target operation action; and extending each action area to obtain the target working area based on the moving speed and the moving direction.

Specifically, when the target operation action is a moving operation, the torso body of the robot can be simplified into a moving rigid body according to a robot body model, an irregular polyhedron can be expanded in proportion (where the polyhedron is divided into several layers according to its height, each layer is a polygonal plane, and each layer depends on the size of the robot) and the polyhedron can be set as the action area of the robot. When the operation is moving, each action area of the polygon can be extended according to the moving speed and moving direction. In detail, each action area of the polygon can be extended along the moving direction and the amount of extension is positively correlated with the moving speed, so as to obtain the target working area. The update frequency can be changed according to the difference of computing platform.

When the target operation action is a non-moving operation, a space area covered when the robot performs the target operation action is determined as the action area.

Specifically, when the target operation action is a non-moving operation, the space covered by the robot executing the action can be collected in advance. The collecting method may include completely executing the action for multiple times and performing incremental computation on all the spaces covered by the robot executing the action with an external 3D structure reconstruction tool. Then, the action area is calculated according to the space area.

During specific calculation, the space can be fitted by different sizes of polygons, and slice count can be modified according to the performance of the calculation platform. The slice count may indicate how many layers of polygon planes with different sizes are required to completely cover the space area. In other words, the space required for the target operation action can be divided into the action area according to each different action.

Therefore, with the above method, the action area can be determined based on the target operation action, which can ensure the accuracy and reliability of the operation area.

In the embodiment of the disclosure, the distance between the robot and the obstacle may be the minimum Euler distance from a body edge of the robot (designed according to the collision model) to the obstacle. For the distance calculation, it is necessary to consider whether a sensor can perceive the omni-directional 360 degree environment in real time.

In an embodiment of the disclosure, the obstacle information is detected by a sensor, and the obstacle information includes a position of the obstacle.

In the embodiment, determining the distance between the robot and the obstacle based on the obstacle information at S202 may include judging whether a preset area where the robot is located is detected by the sensor based on the obstacle information; in response to the preset area where the robot is located being detected by the sensor, obtaining an obstacle position included in the obstacle information and determining the distance between the robot and the obstacle based on the obstacle position; in response to the preset area where the robot is located being not detected by the sensor, generating an obstacle map based on the obstacle information and determining the distance between the robot and the obstacle based on the obstacle map.

The preset area where the robot is located may be set by the user according to the actual needs, such as may be 360-degree area where the robot is located.

Specifically, it can be determined whether the sensor can perceive the omni-directional 360-degree environment in real time. If yes, only the real-time distance needs to be calculated, that is, the obstacle position contained in the obstacle information is obtained and the distance between the robot and the obstacle is determined based on the obstacle position. If no, for example there are only scenes with limited forward direction, an obstacle map is generated based on the obstacle information and the distance between the robot and the obstacle is determined based on the obstacle map.

Further, the obstacle information includes depth map information and point cloud data, generating the obstacle map based on the obstacle information includes generating the obstacle map based on the depth map information or point cloud data.

The obstacle map can be a 3D map generated in real time from data returned by sensors (such as a camera, a laser radar, etc.) in various directions, including the depth map or point cloud data. The expression can be an octree or a triangular grid map.

In other words, whether the sensor can perceive the omni-directional 360-degree environment in real time may depend on a distance between the robot and the obstacle that can be calculated based on the historical depth map (or point cloud). Generally, this data may be recorded in the odometer.

Therefore, the problem of distance calculation that is affected due to incomplete obstacle information can be avoided in this way, and the accuracy and reliability of the distance calculation can be ensured.

In the related art, robot navigation technology is only based on obstacle information, a starting point and an ending point, but does not include the operability of robot action aspect and obstacle emergency treatment in unknown area. However, the embodiment of the disclosure can detect the operability of the robot action aspect and the obstacle emergency treatment in the unknown area.

In an embodiment of the disclosure, the method for controlling a robot may also include in response to the action area required for the target operation action overlapping the obstacle map, determining whether there is an open area in a historical map; in response to the open area being present in the historical map, performing the target operation action based on the open area; and in response to the open area being not present in the historical map, detecting a target operation area within an area with a current position of the robot as a circle center and a preset distance as a radius, until the target operation area is detected.

The historical map may be understood as a map that records and includes obstacles during the historical operation of the robot.

Specifically, when the action area required by the target operation action overlaps with the obstacle map, it can be determined that the robot is currently in a dangerous mode and then it is judged whether there is an open area in the historical map. If there is an open area in the historical map, a target operation area is determined based on the open area, and then the robot can be controlled to operate in the open area. If there is no open area in the historical map, it is detected whether there is a target operation area in an area with a current position of the robot as a center and a preset distance as a radius, until the target operation area is detected.

Specifically, when the robot is moving, it can accept commands both from a remote controller and a navigator at the same time, but the decision-making level may set up the action area. When the command received by the robot may cause the action area to overlap with the obstacle map in the environment, the current state can be marked as a dangerous mode. At this time, an anchor point can be set to the "open area" (if any in the historical map) by the navigator, and the command is then executed. If there is no open area in the historical map, the navigator needs to set an area with the current position as the circle center and the preset distance as the radius, and causes the robot to independently explore the operable area within the set area. If the operable area is present in the set area, the corresponding commands are executed. If the operable area is not present in the set area, searching is stopped and the robot returns to the circle center.

The preset distance can be set manually, for example, it can be set to 10*m* or 20*m* by the operator according to his own needs.

Therefore, the safety can be improved by determining the target working area not only based on the obstacle information, but also based on the action area corresponding to the target operation action.

It should be noted that the embodiment of the disclosure can also control the robot to move to the target working area based on a motion path.

In an embodiment of the disclosure, before controlling the robot to move in the target work area based on the target operation action, the method further includes determining a target motion path between a current robot position and the target work area; and controlling the robot to move to the target work area through the target motion path.

The target motion path may be understood as a path moving from the current position to the target work area.

Specifically, after the current environment information and target operation action are obtained, the target motion path can be determined based on the current environment information and the target operation action. Since the target motion path is determined based on the current environment information and the target operation action, the target motion path can meet the moving requirements of the robot. Then, the robot can be controlled to move in the target working area based on the target operation action.

In the embodiment of the disclosure, the working environment can be divided in different ways according to different action purposes and modes, and different sizes of safe operation ranges are set according to the different requirements of each mode for the environmental area, so as to more accurately improve the safety performance and completion of each operation. On one hand, the working environment is protected, on the other hand, the robot body is protected.

In summary, the embodiments of the disclosure control the robot operation according to the operability of the working environment and the action area, improve operation safety of the robot in different environments, ensure the safety of the robot and other objects in the environment, improve the ability of the robot identifying the environment to a certain extent, and thus improve the operation safety and moving safety performance of the robot. In this way, the maintenance probability can be reduced, and the stability and working adaptability of the robot can be enhanced.

Figure 3:
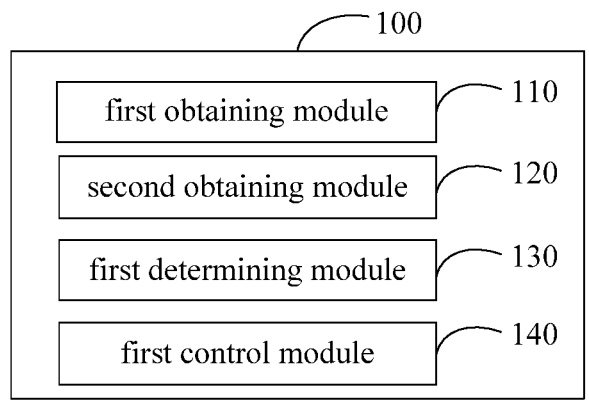
FIG. 3 is a structural block diagram of an apparatus for controlling a robot according to an embodiment of the disclosure.

The embodiments of the disclosure also provide an apparatus for controlling a robot. FIG. 3 is a structural block diagram of an apparatus for controlling a robot according to an embodiment of the disclosure.

As illustrated in FIG. 3, the apparatus 100 for controlling a robot includes a first obtaining module 110, a second obtaining module 120, a first determining module 130 and a first control module 140.

The first obtaining module 110 is configured to obtain a target operation action of the robot. The second obtaining module 120 is configured to obtain current environment information of a working environment where the robot is located. The first determining module 130 is configured to determine a target work area of the robot based on the current environment information and the target operation action. The first control module 140 is configured to control the robot to move in the target work area based on the target operation action.

In an embodiment of the disclosure, the current environment information includes ground material information and obstacle information. The first determining module 130 may include: a first determining unit, configured to determine an operable level of the working environment where the robot is located based on the ground material information; a second determining unit, configured to determine a distance between the robot and the obstacle based on the obstacle information; a third determining unit, configured to determine an action area required for the target operation action; and a fourth determining unit, configured to determine the target work area based on the operable level, the distance, and the action area.

In an embodiment of the disclosure, the target operation action includes a moving operation and a non-moving operation. The third determining unit is specifically configured to: in response to the target operation action being a moving operation, determine a polyhedron corresponding to a torso body of the robot as the action area; and in response to the target operation action being a non-moving operation, determine a space area covered when the robot performs the target operation action as the action area.

In an embodiment of the disclosure, the obstacle information is detected by a sensor, and the obstacle information includes a position of the obstacle. The second determining unit is specifically configured to: judge whether a preset area where the robot is located is detected by the sensor based on the obstacle information; obtain an obstacle position included in the obstacle information in response to the preset area where the robot is located being detected by the sensor; and determine the distance between the robot and the obstacle based on the obstacle position. The second determining unit is specifically further configured to: in response to the preset area where the robot is located being not detected by the sensor, generate an obstacle map based on the obstacle information; and determine the distance between the robot and the obstacle based on the obstacle map.

In an embodiment of the disclosure, the apparatus also includes a first judging module, configured to judge whether there is an open area in a historical map in response to the action area required for the target operation action overlapping the obstacle map; a second determining module, configured to determine the target operation action based on the open area in response to the open area being present in the historical map; a first detecting module, configured to detect a target operation area within a circle area having a center being a current position of the robot and a radius being a preset distance, until the target operation area is detected, in response to the open area being not present in the historical map.

In an embodiment of the disclosure, the apparatus 100 may further include: a third determination module, configured to determine a target motion path between a robot motion and the target work area; and a second control module, configured to control the robot to move to the target work area through the target motion path.

It should be noted that, the specific implementation of the apparatus for controlling a robot may refer to that of the method for controlling a robot in the above embodiments, which may not be repeated herein.

The apparatus for controlling a robot according to the embodiment of the disclosure determines the target working area of the robot based on the current environmental information and the target operation action, controls the robot to move in the target working area based on the target operation action, and realizes automatic control of the robot. Therefore, it is conducive to the robot to avoid danger autonomously, improving the perception ability and the operation safety of the robot, and improving the user experience.

Figure 4:
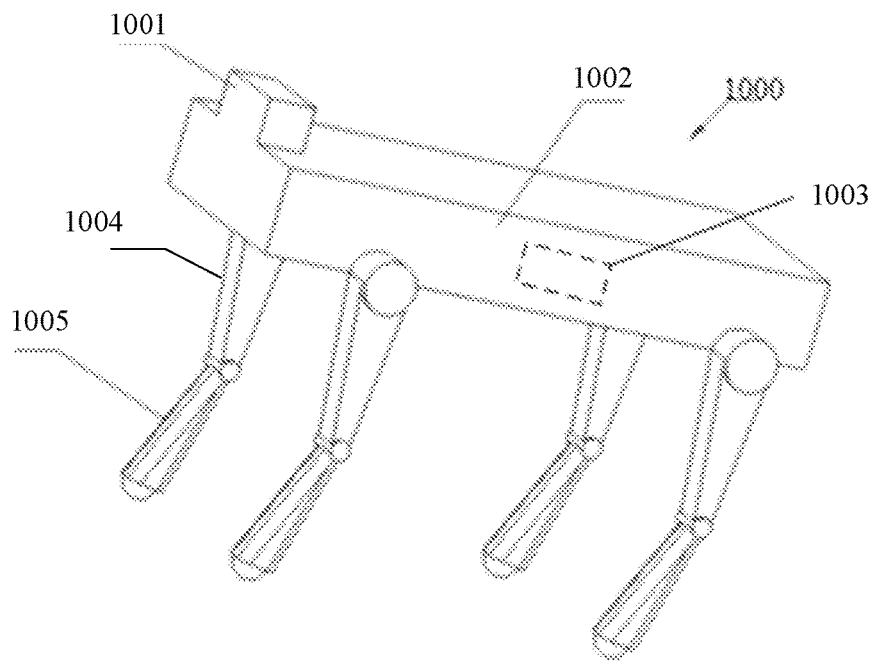
FIG. 4 is a structural diagram of a robot according to an embodiment of the disclosure.

The embodiment of the disclosure also provides a robot. As illustrated in FIG. 4, the robot 1000 includes a head 1001, a torso body 1002, a controller 1003, legs 1004 connected with the torso body, and feet 1005 connected with the legs. The controller 1003 may be connected with various components of the robot, so that the robot can perform target actions based on the computer instructions. The controller 1003 may be configured to implement the method for controlling a robot as described in the above embodiments. The robot in the embodiment of the disclosure, through its own control apparatus, determines the target working area of the robot based on the current environmental information and the target operation action, controls the robot to move in the target working area based on the target operation action, and realizes automatic control of the robot. Therefore, it is conducive to the robot to avoid danger autonomously, improving the perception ability and the operation safety of the robot, and improving the user experience.

Figure 5:
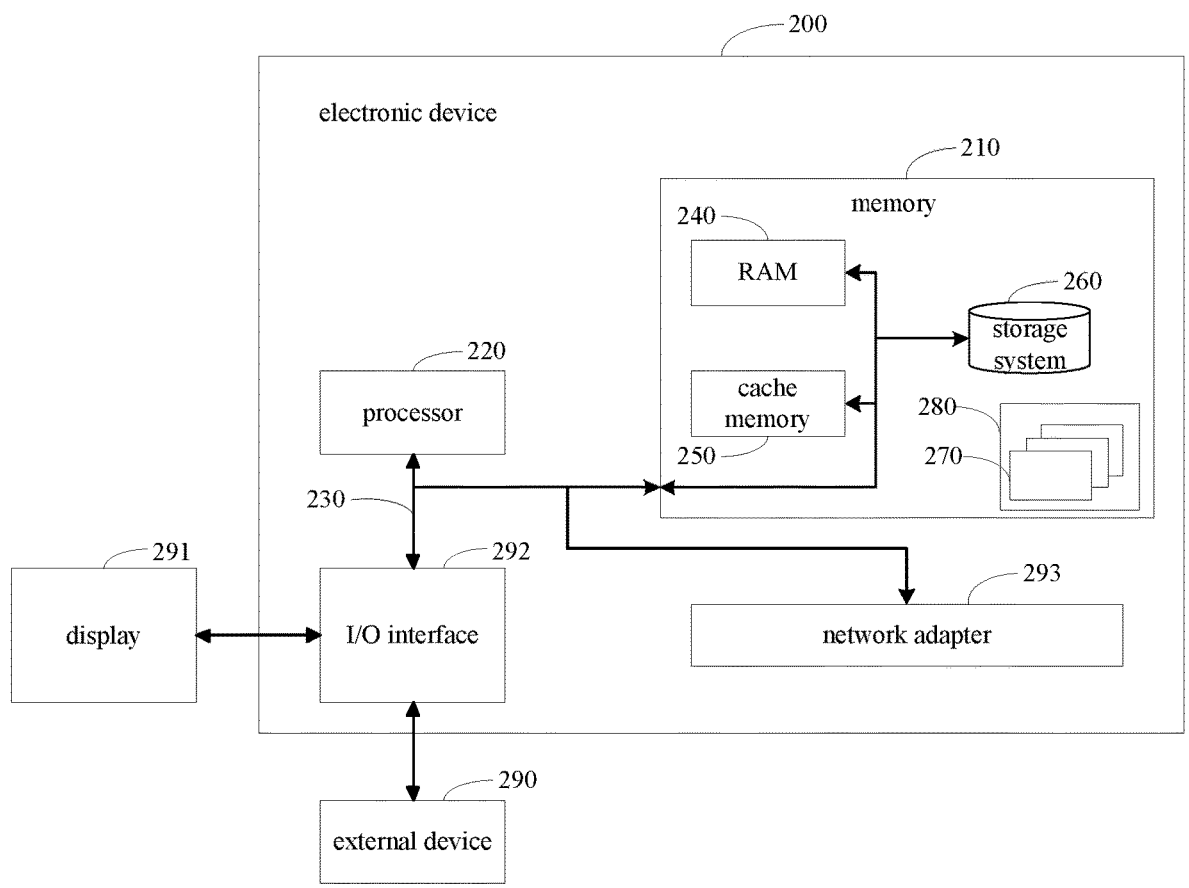
FIG. 5 is a structural diagram of an electronic device according to an embodiment of the disclosure.

FIG. 5 is a structural block diagram of an electronic device according to an embodiment of the disclosure. For example, the electronic device 200 includes a memory 210, a processor 220, and a bus 230 connected with different components (including the memory 210 and the processor 220).

The memory 210 is used to store instructions executable by the processor 220. The processor 201 is configured to call and execute executable instructions stored in the memory 202 to implement the method for controlling a robot in the above embodiments of the disclosure.

Bus 230 represents one or more of several types of bus structures, including a memory bus or a memory controller, a peripheral bus, a graphics acceleration port, a processor, or a local bus using any of a variety of bus structures. For example, the architectures include but are not limited to an industry standard architecture (ISA) bus, a micro-channel architecture (MAC) bus, an enhanced ISA bus, a video electronics standards association (VESA) local bus and a peripheral component interconnection (PCI) bus.

The electronic device 200 typically includes a variety of electronic device readable media. These media may be any available media that can be accessed by the electronic device 200, including volatile and non-volatile media, removable and non-removable media.

The memory 210 may also include a computer system readable medium in the form of volatile memory, such as a random access memory (RAM) 240 and/or a cache memory 250. The electronic device 200 may further include other removable/non-removable, volatile/nonvolatile computer system storage media. For example only, the storage system 260 may be used to read and write non-removable, non-volatile magnetic media (not shown in FIG. 5, commonly referred to as a "hard disk drive"). Although not shown in FIG. 5, it may be provided a disk drive for reading and writing a removable nonvolatile disk (e.g., a "floppy disk") and an optical disk drive for reading and writing a removable nonvolatile optical disc (e.g., a CD-ROM, a DVD-ROM or other optical medium). In these cases, each drive may be connected to bus 230 through one or more data media interfaces. The memory 210 may include at least one program product having a set (e.g., at least one) of program modules configured to perform the functions of embodiments of the disclosure.

A program/utility 280 having a set (at least one) of program modules 270 may be stored, for example, in the memory 210. Such program modules 270 include, but are not limited to, an operating system, one or more applications, other program modules, and program data. Each or some combination of these examples may include an implementation of a network environment. The program module 270 typically performs functions and/or methods in the embodiments described in the disclosure.

The electronic device 200 may also communicate with one or more external devices 290 (e.g., a keyboard, a pointing device, a display 291, etc.), with one or more devices that enable the user to interact with the electronic device 200, and/or with any device (e.g., a network card, a modem, etc.) that enables the electronic device 200 to communicate with one or more other computing devices. This communication may be performed through the input/output (I/O) interface 292. Further, the electronic device 200 may also communicate with one or more networks (such as a local area network (LAN), a wide area network (WAN), and/or a public network, such as the Internet) through the network adapter 293. As shown in the FIG. 5, the network adapter 293 communicates with other modules of the electronic device 200 through the bus 230. It should be understood that although not shown in the figure, other hardware and/or software modules can be used in combination with the electronic device 200, including but not limited to micro-codes, device drivers, redundant processing units, external disk drive arrays, RAID systems, tape drives, data backup storage systems, etc.

The processor 220 executes various functional applications and data processing by running programs stored in the memory 210.

It should be noted that the implementation of the electronic device in the embodiment of the disclosure is described in the foregoing explanation of the data processing in the embodiment of the disclosure, which will not be repeated here.

In order to realize the above embodiments, the embodiments of the disclosure also provide a non-transitory computer-readable storage medium, which enables the electronic device to execute the method for controlling a robot as described above when the instructions in the storage medium are executed by a processor of the electronic device.

In order to realize the above embodiments, the embodiments of the disclosure also provide a computer program product. When the computer programs are executed by a processor of an electronic device, the electronic device is caused to execute the method for controlling a robot as described above.

After considering the specification and practicing the disclosure herein, those skilled in the art will easily think of other implementations. The present application is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the present invention is not limited to the precise structure described above and shown in the drawings, and various modifications and changes may be made without departing from its scope. The scope of the present application is only limited by the appended claims.

What is claimed is:

1. A method for controlling a robot, comprising:
   obtaining a target action of the robot;
   obtaining environment information of a working environment where the robot is located, wherein the environment information comprises ground material information and obstacle information of an obstacle;
   determining a target work area of the robot based on the environment information and the target action; and
   controlling the robot to move in the target work area based on the target action;
   wherein determining the target work area of the robot comprises:
   determining an operable level of the working environment where the robot is located based on the ground material information, wherein the operable level is configured to characterize a level that a current ground environment is suitable for robot stepping or action;
   determining a distance between the robot and an obstacle based on the obstacle information;
   in response to the target action being a moving action other than a jumping action, a dancing action and a somersault action, determining a polyhedron corresponding to a torso body of the robot as an action area required for the target action; and
   determining the target work area based on the operable level, the distance, and the action area.

2. The method of claim 1, wherein determining the action area required for the target action further comprises:
   in response to the target action being the jumping action, the dancing action or the somersault action, determining a space area covered when the robot performs the target action as the action area.

3. The method of claim 1, wherein the obstacle information is detected by a sensor, and the obstacle information comprises an obstacle position, determining the distance between the robot and the obstacle comprises:
   judging whether a preset area where the robot is located is detected by the sensor based on the obstacle information;
   obtaining the obstacle position included in the obstacle information in response to the preset area where the robot is located being detected by the sensor; and
   determining the distance between the robot and the obstacle based on the obstacle position.

4. The method of claim 3, determining the distance between the robot and the obstacle further comprises:
   in response to the preset area where the robot is located being not detected by the sensor, generating an obstacle map based on the obstacle information; and
   determining the distance between the robot and the obstacle based on the obstacle map.

5. The method of claim 4, further comprising:
   in response to the action area required for the target action overlapping the obstacle map, determining whether there is an open area in a historical map;
   in response to the open area being present in the historical map, performing the target action based on the open area; and
   in response to the open area being not present in the historical map, detecting a target area within an area with a current position of the robot as a circle center and a preset distance as a radius, until the target area is detected.

6. The method of claim 1, further comprising:
   determining a target motion path between a robot position and the target work area; and
   controlling the robot to move to the target work area through the target motion path.

7. The method of claim 2, further comprising:
   obtaining a moving speed and a moving direction of the target action; and
   extending each action area along the moving direction based on the moving speed to obtain the target working area.

8. The method of claim 4, wherein the obstacle information comprises depth map information and point cloud data,
   generating the obstacle map comprises: generating the obstacle map based on the depth map information or point cloud data.

9. An apparatus for controlling a robot, comprising:
   a processor; and
   a memory for storing instructions executable by the processor;
   wherein the processor is configured to
   obtain a target action of the robot;
   obtain environment information of a working environment where the robot is located, wherein the environment information comprises ground material information and obstacle information of an obstacle;
   determine a target work area of the robot based on the environment information and the target action; and
   control the robot to move in the target work area based on the target action;
   wherein the processor is further configured to:
   determine an operable level of the working environment where the robot is located based on the ground material information, wherein the operable level is configured to characterize a level that a current ground environment is suitable for robot stepping or action;
   determine a distance between the robot and the obstacle based on the obstacle information;
   in response to the target action being a moving action other than a jumping action, a dancing action and a somersault action, determine a polyhedron corresponding to a torso body of the robot as an action area required for the target action; and determine the target work area based on the operable level, the distance, and the action area.

10. The apparatus of claim 9, wherein the processor is further configured to:
in response to the target action being the jumping action, the dancing action or the somersault action, determine a space area covered when the robot performs the target action as the action area.

11. The apparatus of claim 9, wherein the obstacle information is detected by a sensor, and the obstacle information comprises an obstacle position, and the processor is further configured to:
judge whether a preset area where the robot is located is detected by the sensor based on the obstacle information;
obtain an obstacle position included in the obstacle information in response to the preset area where the robot is located being detected by the sensor; and
determine the distance between the robot and the obstacle based on the obstacle position.

12. The apparatus of claim 11, wherein the processor is further configured to:
in response to the preset area where the robot is located being not detected by the sensor, generate an obstacle map based on the obstacle information; and
determine the distance between the robot and the obstacle based on the obstacle map.

13. The apparatus of claim 12, wherein the processor is further configured to:
judge whether there is an open area in a historical map in response to the action area required for the target action overlapping the obstacle map;
perform the target action based on the open area in response to the open area being present in the historical map; and
detect a target area within an area with a current position of the robot as a circle center and a preset distance as a radius, until the target area is detected, in response to the open area being not present in the historical map.

14. The apparatus of claim 9, wherein the processor is further configured to:
determine a target motion path between a robot position and the target work area; and
control the robot to move to the target work area through the target motion path.

15. The apparatus of claim 10, wherein the processor is further configured to:
obtain a moving speed and a moving direction of the target action; and
extend each the action area along the moving direction based on the moving speed to obtain the target working area.

16. The apparatus of claim 12, wherein the obstacle information comprises depth map information or point cloud data, the processor is further configured to generate the obstacle map based on the depth map information or point cloud data.

17. A robot, comprising:
a head, a torso body, legs connected with the torso body, feet connected with the legs;
a sensor configured to obtain obstacle information by detecting a working environment where the robot is located; and
a controller connected with the torso body, configured to:
obtain a target action of the robot, determine ground material information of the working environment through a deep neural network model, wherein the environment information comprises ground material information and obstacle information of an obstacle, determine a target work area of the robot based on the obstacle information, the ground material information and the target action, and control the robot to move in the target work area based on the target action;
wherein the controller is further configured to:
determine an operable level of the working environment where the robot is located based on the ground material information, wherein the operable level is configured to characterize a level that a current ground environment is suitable for robot stepping or action;
determine a distance between the robot and an obstacle based on the obstacle information;
in response to the target action being a moving action other than a jumping action, a dancing action and a somersault action, determine a polyhedron corresponding to a torso body of the robot as an action area required for the target action; and
determine the target work area based on the operable level, the distance, and the action area.

* * * * *